Sept. 25, 1934. W. H. POWELL Re. 19,326
SYSTEM OF DISTRIBUTION
Original Filed May 27, 1927
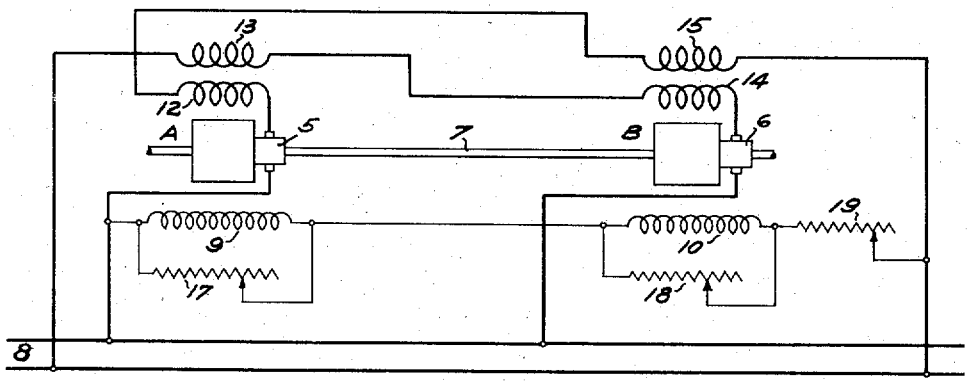
Inventor
W. H. Powell
by G. F. Dilbrin
Attorney Reissued Sept. 25, 1934 Re. 19,326

UNITED STATES PATENT OFFICE 19,326

SYSTEM OF DISTRIBUTION

William H. Powell, Wauwatosa, Wis., assignor to Allis-Chalmers Manufacturing Company, Milwaukee, Wis., a corporation of Delaware Original No. 1,803,676, dated May 5, 1931, Serial No. 194,578, May 27, 1927. Application for reissue May 4, 1933, Serial No. 669,376

17 Claims. (Cl. 171—223)

This invention relates in general to systems of electrical distribution, and it has more particular relation to a system involving or embodying a plurality of direct current dynamo electric machines arranged to drive or supply a common load.

When a plurality of direct current machines, more particularly shunt wound machines, are connected to a common load, it is desirable that they share the common load in some definite or predetermined proportion, such as the proportion between the capacities of the respective machines. However, in practice, it is found that, even though such machines be initially adjusted to properly distribute the common load for some particular condition, differences in characteristics of the several machines, such as may be incident to differences in temperature of portions of the windings of the machines, particularly the field windings thereof, are liable to cause an unbalancing or disproportionate division of the load on the machines during operation thereof, particularly under conditions of wide variation in the total load on the machines. The effects of such an unbalancing of the load on the several machines are cumulative, with resulting tendency of one of the machines to "grab" or "hog" a greater and greater share of the total load, with consequent undesirable results and possible damage due to overloading one of the machines, and limitation upon the total effective capacity of the several machines together, arising from inability of one machine to carry a proper or fair share of the total load.

The present invention contemplates a system of distribution involving a plurality of direct current machines mechanically connected to or otherwise arranged to drive or supply energy to a common load, with provisions made for insuring that the common load is shared in a desired proportion between the several machines even over extreme ranges of variation in total load. Advantages of the invention are particularly apparent in a system wherein a plurality of shunt wound machines of this character are mechanically connected, as through a common armature shaft. In its broad aspect, the invention includes a utilization of any departure, or tendency to departure, of one machine from its normal share of the load to immediately cause the other machine to respond in such a manner as to bring back the normal distribution of the load on the several machines.

Where the invention is applied to a system of the above described general character wherein a plurality of direct current motors have field windings of the shunt type, and the motors are mechanically connected to drive a common load, it is possible to secure most desirable results in the matter of distribution of the load between the several machines over a great range of variation in the total load; and with a proper design of the interrelated series or corresponding windings in accordance with the disclosure herein, the desired flat characteristic curve of the shunt machines may be preserved to the highest degree during the maximum variation in load.

It is an object of the present invention to provide an improved system of electrical distribution wherein a plurality of dynamo electric machines are mechanically connected to or otherwise arranged to drive or supply energy to a common load and the electrical effects produced in the windings of the several machines are so related or interdependent as to insure a uniform distribution of the total load on the several machines throughout a wide variation in the value of such load. And it is a further object to provide an improved system having herein above described characteristics and wherein the energizing effects due to a field winding element, which are substantially the energizing effects of a series winding on one machine, are made dependent upon the current in the armature of another machine.

A more particular object of the present invention is to provide an improved system of distribution embodying a plurality of direct current motors connected to drive a common load, the motors being provided with windings of the shunt type, and additional winding sections on one motor producing energizing effects dependent upon both the current in the armature of that particular motor and the current in the armature of another motor, to the end that a distribution of load upon the several motors is secured which is in close accordance with that desired throughout a wide range of variation in the value of such load.

These and other objects and advantages are attained by the present invention, various novel features of which will be apparent from the accompanying description and the drawing, disclosing an embodiment of the invention, and will be more particularly pointed out in the claims.

The illustrative disclosure of the drawing is in the form of a diagrammatic showing of a system of distribution embodying features of the present invention.

In accordance with the disclosure of the drawing, A and B may be considered as direct current motors having armatures 5 and 6, respectively, connected to a common load, represented by a common armature shaft 7. The windings of the armatures 5 and 6 of the motors A and B, respectively, are supplied from a direct current source of supply 8. The motors A and B are provided with shunt field windings 9 and 10, respectively, preferably connected in series across the supply line to insure the same current flow through the two windings at all times, a feature which contributes to stable operation of the two machines. Each of the motors A and B is provided with a series winding arranged in two sections, one of the sections being connected in series with the armature of the particular motor and the other section being in series with the armature of the other motor.

The series winding of the motor A includes a section 12 in series with the armature 5 of this motor and a section 13 in series with the armature 6 of the motor B; and the series winding of the motor B includes a section 14 in series with the armature 6 of this latter motor and a section 15 in series with the armature 5 of the motor A. The series winding sections 12 and 13 of the motor A and 14 and 15 of the motor B are designed and arranged so that under normal conditions of operation, the energizing effects of the two sections of such series winding on each motor neutralize each other. While the auxiliary windings 12, 13 and 14, 15 are ordinarily disposed on the main field poles, nevertheless, where the machine is provided with an interpole winding, the desired energizing effects of one of the windings 12 or 13 and 14 or 15 may often be secured merely through suitable arrangement of the strap connections, between the sections of such interpole winding, which lie alongside of the main field poles. If this condition of neutralization of the ampere turns of the two winding sections cannot be satisfactorily accomplished through the turns of the winding alone, other means, such as adjustable shunt resistances may be used in connection with these winding sections. In the case of the motor A, the winding section 12 produces energizing effects which are cumulative and the winding section 13 produces energizing effects which are differential relative to the energizing effects of the shunt winding 9 of this motor; and in the case of the motor B, the winding section 14 produces energizing effects which are cumulative and the winding section 15 produces energizing effects which are differential with respect to the energizing effects of the shunt winding 10 of this motor.

The shunt windings 9 and 10 of the motors A and B, respectively, may be provided with adjustable resistances 17, 18, respectively, across the terminals of these windings and these, alone or in conjunction with a variable resistance in series with the shunt winding and in parallel to the adjustable resistance 17 or 18, may serve to vary the current in any manner that may be desired for the purpose of securing the desired ampere turns of these windings. A resistance 19 may be inserted in series with the shunt windings 9 and 10 of the two motors, and this resistance may be of the plain variable type or of a type which provides for both variation and reversal of the current through the shunt windings.

When motors such as A and B are in contemplated normal operation, supplied from the line circuit 8 and connected to drive a common load, each motor supplies its definite predetermined share of such load; in case of any initial unbalancing, or even definite tendency toward substantial unbalancing, of the adjustment of the load upon the two machines, as in the case of one motor "grabbing" more than its contemplated share of the total load, the series winding of that particular motor, due to increased current therein, has the effect of tending to strengthen the field of such motor with a consequent tendency toward slowing down of such motor and forcing the other motor to assume a greater share of the load. While this result or tendency of the ordinary or cumulative series winding is a desirable one in the matter of seeking to maintain the desired balancing of the load on the several motors, nevertheless, it becomes quite difficult to maintain the normally desired speed characteristics of the motors over the full range of variation in the load thereon, particularly at the lower values of load.

With the specific arrangement described hereinabove, in accordance with which each motor is provided with two series winding sections having opposing energizing effects on the fields of the machines, and under normal conditions neutralizing each other, thus affording no substantial compounding effect under normal conditions of operation, it is possible to maintain the desired balance of load on the two machines throughout the entire range of load variation thereon, for the machines thus act substantially as ordinary shunt wound machines, except in the case of momentary "grabbing" of load by one machine, a condition which is immediately rectified to an effective degree as it occurs. For, in case there is a tendency or attempt of one of the motors, such as the motor A, to "grab" more than its share of the total load, the increased current flow in the cumulative series winding section 12, either alone or through the added effect of a possible decrease in the energizing effect of the differential series winding section 13, causes an increase in the energization of the field of the motor A, with a consequent tendency toward slowing down of this motor; and the increased current in the armature circuit of the motor A and through the differential series winding section 15 of the motor B, either alone or in connection with a possible decrease in the energizing effect of the cumulative series winding section 14, causes a decrease in the total energization of the field of the motor B, with a consequent tendency of the latter to speed up and take a greater share of the load; and the effective result is that the load on each motor is caused to return to a value corresponding to the particular share or proportion of the total load which the motor should carry. It will be apparent that, in case the motor B should attempt to "grab" more than its share of the load, the equalizing effect of the neutralizing series winding on the two motors would be exerted in an opposite sense, with the final result that the two motors are caused to return to and substantially maintain their proportionate share of the total load.

While in an ordinary case the mechanical connection of a plurality of motors to drive or supply energy to a common load is afforded through a mechanical connection of the rotating elements or armatures of the motors to a single drive shaft, as shown and described hereinabove, advantages of this invention are realizable with other known methods of affording a mechanical connection of the several motors to drive or supply energy to a common load, such as with a connection afforded through a piece of stock or material on which a plurality of feeding or reducing devices operate, where each of such latter devices is driven or supplied with energy from its individual motor, the stock or material acting as the mechanical connection between the several motors.

With the particular arrangements of series windings for the machines as described hereinabove, it is possible to secure a substantial compounding effect for the machines under conditions of instability or tendency to disproportionate sharing of the load on the machines; but under ordinary conditions of operation throughout the full variation in the value of the total load on the machines, there need be no substantial compounding effect on the motors, and there is, accordingly, no substantial adverse effect from such a source to cause undesirable speed variation, particularly at the lighter load values.

In the case of the embodiment of the field winding features set forth hereinabove, in a plurality of generators to improve the stability of the same in carrying their proportional share of the total load, that section of series field winding on each machine which is in series with the armature of such machine, corresponding to the winding sections 12 or 14 of the motors A and B, respectively, would have a differential effect relative to the shunt winding of the machine, instead of a cumulative effect, as described above in the case of two motors; and that winding section on each machine which is in series with the armature of the other machine is disposed so as to have a cumulative effect relative to the shunt winding of the particular machine. With such an arrangement, a momentary increase in the load on one generator causes a weakening of the field of that particular generator and a strengthening of the field of the other generator, with the consequent result of shifting a portion of any increase in load on one machine to the other machine, and hence an effective maintenance of the desired distribution of the load on the two machines.

While advantages of the present invention are realizable in connection with a plurality of generators connected to supply energy to a common load where the armatures of several generators are driven by the same shaft, or otherwise mechanically connected, it will also be apparent that advantages of this invention are likewise attainable with a plurality of generators connected to supply energy to a common load circuit, even though the generators are driven from separate sources of mechanical power, in this latter instance the electrical connection alone serving as the power link or connection between the several machines supplying the common load.

It will be apparent that desired advantages of the present invention are attainable with dynamo electric machines generally of the shunt type and arranged to supply energy, mechanical or electrical, to a common load, through the use of field winding elements on the dynamo electric machines which produce effective energization of the desired regulating character in the fields of the machines substantially only on or with the occurrence of a disturbance of or departure from the normal distribution of load on the several machines, and that these desired additive or subtractive regulating energizing effects are attainable in certain commercial applications of the invention without the complication of additional regulating equipment external of the machine.

It will be apparent that the term "of the shunt type", as descriptive of the type of field energization of the machines, is used herein in its broad sense, particularly such as includes separate excitation, or generally to distinguish from the type of excitation which is essentially dependent in greater part on the value of the armature current of the machine.

Through the use of the present invention, which can with little or no difficulty be readily applied to machines already in operation, it is possible to obtain greatly improved regulation in the matter of causing the individual machines to assume their contemplated share of the total load and, likewise, particularly in the case of motors mechanically connected to a common load, to insure a most desirable stability in the matter of speed characteristics throughout the full range of variation in the total load on the machines.

It should be understood that the invention claimed is not limited to the exact details set forth hereinabove, for obvious modifications within the scope of the invention may be apparent to persons skilled in this particular art.

It is claimed and desired to secure by Letters Patent:

1. In combination, a plurality of direct current dynamo electric machines having normal operating characteristics of shunt wound machines and connected to supply a common load, each machine having a regulating field winding, said regulating winding on one of said machines including sections connected to carry current proportional in a substantially constant degree to that in the armature circuits of the respective machines under conditions of balanced and unbalanced operation of said machines and producing energizing effects which neutralize each other during normal operation of said machines.

2. In combination, a plurality of direct current dynamo electric machines connected to supply power to a common load and having shunt operating characteristics throughout substantially the full range of load variation, each of said machines having its main exciting winding of the shunt type and also having a regulating winding consisting of winding sections in series respectively with its own armature and the armature of the other machine, said winding sections producing magnetic effects which neutralize each other under normal conditions of balance of the load on the two machines and producing a decrease in the magnetizing effect on one machine due to the winding section thereon in series with the armature of the other machine on decrease in the load on the latter machine with respect to the load on the other machine.

3. Apparatus of the character defined by claim 2, wherein the main windings of the shunt type of the several machines are connected in series with each other.

4. In combination, a plurality of direct current motors connected to supply power to a common load and having shunt operating characteristics throughout substantially the full range of load variation, each of said machines having a regulating field winding consisting of a cumulative winding section in series with its own armature and a differential section in series with the armature of another of said machines and producing magnetic effects which neutralize each other throughout substantially the full range of variation in balanced load on said machines.

5. In combination, a plurality of direct current motors mechanically connected to supply power to a common driving shaft and having shunt operating characteristics throughout substantially the full range of load variation, each of said machines having its main exciting winding of the shunt type and also having a regulating winding consisting of two sections connected respectively in series with its own armature and the armature of the other machine, the winding section on each machine connected in series with the armature of the other machine being connected to be supplied through the armature circuit of the latter machine under normal conditions of balanced load on said machines, and said winding sections producing magnetic effects which neutralize each other under normal conditions of balance of the load on said machines.

6. In combination, a plurality of direct current electric motors connected to supply a common load, each of said motors having field exciting windings for producing operating characteristics of a shunt wound motor during operation of the motor throughout its full range of load, the field winding of each motor including a main winding of the shunt type, with said main windings connected in series with each other, and a regulating winding, said regulating winding including sections in circuit respectively with its own armature and with the armature of the other motor, the winding section on each machine connected in circuit with the armature of the other machine being connected to be supplied wholly through the armature circuit of the latter machine under normal conditions of balanced load on said machines, and said regulating winding producing magnetizing effects which neutralize each other during normal operation of the machine but which produce a corrective increment of energization on the occasion of a departure from a predetermined normal distribution of the load between said motors.

7. In combination, a plurality of direct current dynamo electric machines connected to furnish energy to a common load and having main field windings of the shunt wound type and normal operating characteristics essentially due to said shunt field windings, each of said machines having auxiliary field windings in a plurality of sections having energizing effects which normally oppose each other, one of said winding sections being connected to carry current proportional to that in its own armature circuit and the other of said winding sections being connected to carry current independent in value upon the current in the armature of its own machine and dependent in value upon the current in the armature circuit of another of said machines, the energizing effects of said auxiliary winding sections neutralizing each other throughout a substantial range of variation in the total load on said machines.

8. In combination, a plurality of direct current machines connected to furnish energy to a common load and having main field windings of the shunt type and operating characteristics which are essentially those of shunt wound machines throughout substantially the normal range of load variation thereon, and means for effecting and maintaining a predetermined division of the load on said machines, said means including a plurality of winding sections on each of said machines connected to produce differential effects which neutralize each other to a predetermined degree during normal operation of said machines, the effective energization due to one of said winding sections varying with the current in its own armature circuit and the effective energization due to the other of said winding sections varying with the current in the armature circuit of the other machine and independently of the current in the armature circuit of its own machine.

9. In combination, a plurality of direct current dynamo electric machines connected to supply power to a common load and having operating characteristics which are essentially those of shunt wound machines throughout substantially the normal range of load variation, and means associated with said machines and responsive to a departure from a predetermined proportional distribution of the load on said machines for causing said load distribution to return toward said predetermined normal, said means comprising a plurality of winding sections carrying current proportional to the load on the several machines and producing differential magnetizing effects which substantially neutralize each other during said predetermined proportional distribution of the load on said machines and producing a resultant energizing effect proportional in a substantially constant degree to the departure from said predetermined proportional load distribution.

10. In combination, a plurality of direct current motors connected to supply power to a common load and having operating characteristics essentially those of shunt wound machines throughout the normal range of load variation, each of said motors having in addition to its main exciting winding of the shunt type an auxiliary winding consisting of a plurality of winding sections connected to carry current proportional to the current in its own armature and the armature of the other motor respectively under all conditions of operation of said machines to supply power to the common load, said winding sections producing differential field energizing effects on said motor which neutralize each other to a predetermined degree under normal conditions of balance of the load on said motors.

11. In combination, a plurality of direct current dynamo electric machines having normal operating characteristics of shunt wound machines and arranged to supply energy to a common load, one of said machines having a winding for regulating the effective field energization of said machine during normal operation thereof for energy-supplying purposes, said winding including sections disposed on the main field poles with one section of said winding connected to carry current proportional in a substantially fixed degree to that in the armature circuit of the other machine, and said several sections exerting differential energizing effects on the field of said machine and substantially neutralizing each other under conditions of normal distribution of load on the several machines.

12. In combination, a plurality of direct current machines having operating characteristics which are essentially those of shunt wound machines throughout substantially the normal range of load variation and arranged to supply energy to a common load, and means for maintaining substantially constant a predetermined proportional distribution of the load on the several machines, said means comprising a regulating field winding on each machine and connected to the armature circuits of the several machines, the regulating field winding of each machine carrying current proportional to the armature current of its own machine and another machine at all times, and said regulating windings producing minimum energizing effects upon the fields of said machines under conditions of normal or predetermined distribution of load on said machines, and effective throughout the normal range of load variation to produce effective plus or minus increments of field energization of said machines on the occasion of a disturbance or departure from said normal distribution of load on said machines.

13. In combination, a plurality of direct current machines having operating characteristics which are essentially those of shunt wound machines throughout substantially the normal range of load variation and connected to supply a common load, each machine having a regulating field winding comprising a section connected to be supplied wholly from its own armature circuit and a section connected to be supplied wholly from the armature circuit of the other machine, said regulating windings producing inappreciable energizing effects upon the fields of said machines under conditions of normal or desired distribution of load on said machines, and operative to produce effective increments of field energization or deenergization of said machines on the occasion of a departure in one direction or the other from said normal distribution of load and tending to reestablish the normal distribution of load on said machines.

14. In combination, a plurality of direct current motors arranged to supply energy to a common load and having shunt operating characteristics throughout substantially the full range of load variation, each of said motors having a regulating field winding comprising a section connected to be supplied wholly from its own armature circuit and a section connected to be supplied wholly from the armature circuit of the other motor, said regulating windings producing inappreciable magnetic effects upon their respective motors under normal conditions of load balance on said motors.

15. In combination, a plurality of direct current machines arranged to supply energy to a common load and having shunt operating characteristics throughout substantially the full range of load variation, each of said machines having a regulating field winding including a section connected to carry current proportional to the current in the armature circuit of that machine and a section connected to carry current independent of the current in the armature of that machine and proportional to the current in the armature circuit of another of said machines, said regulating windings producing inappreciable magnetic effects upon their respective machines under normal conditions of load balance on said machines.

16. In combination, a plurality of direct current machines arranged to supply energy to a common load and having shunt operating characteristics throughout substantially the full range of load variation, each of said machines having a regulating field winding including portions connected with its own armature and the armature of one or more other machines, a portion of the regulating field winding on each machine connected to the armature of another machine acting to reduce the magnetizing effect of said portion on decrease of the current in the armature circuit of said other machine, and said regulating windings producing inappreciable magnetic effects upon their respective machines under normal conditions of load balance on said machines.

17. In combination, a plurality of direct current machines arranged to supply energy to a common load and having shunt operating characteristics throughout substantially the full range of load variation, each of said machines having a regulating field winding including a portion connected to be supplied wholly from its own armature and a portion connected to be supplied wholly from the armature of another machine, said regulating windings producing inappreciable magnetic effects upon their respective machines under normal conditions of load balance on said machines, and producing a resultant positive or negative increment of field energization on each machine dependent upon the direction of departure of the load on the machine from balanced condition.

WILLIAM H. POWELL.